US005450347A

United States Patent [19]

Thoms et al.

[11] Patent Number: 5,450,347

[45] Date of Patent: Sep. 12, 1995

[54] METHOD FOR THE AUTOMATIC, INTERACTIVE PROCESS OPTIMIZATION OF DRAWING PROCESSES IN PRESSES

[75] Inventors: Volker Thoms, Calw; Wolfram Käss, Steinheim, both of Germany

[73] Assignee: Mercedes-Benz AG, Germany

[21] Appl. No.: 114,225

[22] Filed: Sep. 1, 1993

[30] Foreign Application Priority Data

Sep. 1, 1992 [DE] Germany ........................ 42 29 155.0

[51] Int. Cl.[6] ........................ G06F 15/46

[52] U.S. Cl. ........................ 364/476; 73/862.53; 364/472; 72/31

[58] Field of Search ........................ 364/476, 472, 551.01, 364/552, 506, 507, 508; 72/3, 7, 12, 21, 26; 73/862.51, 862.53, 862.541

[56] References Cited

U.S. PATENT DOCUMENTS

| | | | |
|---|---|---|---|
| 4,750,131 | 6/1988 | Martinez | 364/476 |
| 4,855,923 | 8/1989 | Fullmer | 364/468 |
| 4,939,665 | 7/1990 | Gold et al. | 364/476 |
| 5,088,333 | 2/1992 | Kiely et al. | 73/862.53 |
| 5,119,311 | 6/1992 | Gold et al. | 364/476 |
| 5,224,053 | 6/1993 | Cook | 364/476 |
| 5,311,759 | 5/1994 | Mangrulkar et al. | 72/12 |

FOREIGN PATENT DOCUMENTS

| | | |
|---|---|---|
| 0312809A3 | 4/1989 | European Pat. Off. . |
| 3735581C1 | 5/1988 | Germany . |
| 3744177A1 | 7/1989 | Germany . |
| 4038866A1 | 7/1991 | Germany . |

OTHER PUBLICATIONS

Neff et al., CNC–und DNC–Betrieb bei hydraulischen Pressen, 1986, pp. 947–949.

Bauer et al., Rechnergesteuerter Niederhalterdruck optimiert das Tiefziehen, 1990, pp. 50–54.

*Primary Examiner*—Roy N. Envall, Jr.
*Assistant Examiner*—Thomas E. Brown
*Attorney, Agent, or Firm*—Evenson, McKeown, Edwards & Lenahan

[57] ABSTRACT

A method for the iterative process optimization of drawing processes, occurring in timed sequence, in drawing presses, in which the clamping force which can be set at the blank holder is reduced (in the case of fractures) or increased (in the case of folding) or maintained at the same level (in the case of acceptable parts) for a subsequent working cycle as a function of the drawn part quality of a drawn part drawn in a proceeding working cycle. In order to be able to detect the drawn part quality with respect to the criteria of fractures, acceptable or folding automatically during each working cycle and, accordingly, to be able to design the optimization process as a genuine control process which occurs automatically in a closed cycle, before the start-up of production of a specific type of a part to be drawn, a pressing stroke-dependent desired value drawing force range of the drawing force exerted on the drawn part during the drawing process is detected and the data are stored, the drawing force needing to stay within this range in order to be able to expect fracture-free and fold-free, that is to say acceptable drawn parts. During production, the pressing-stroke-dependent actual-value drawing force variation is measured and it is monitored whether this variation stays within thaws desired-value drawing force range during the entire drawing path and/or whether it has exceeded (fractures) or undershot (folds) the desired-value drawing force range. Influencing factors which are relevant to the drawing process and can be detected on the semi-finished product are also continuously detected and appropriately taken into account when setting the blank-holding force.

11 Claims, 2 Drawing Sheets

METHOD FOR THE AUTOMATIC, INTERACTIVE PROCESS OPTIMIZATION OF DRAWING PROCESSES IN PRESSES

BACKGROUND AND SUMMARY OF THE INVENTION

The present invention relates to a method for operating a drawing press which produces a drawn part during each working cycle, one blank being inserted into the drawing tool of the drawing press, this tool including a die, a punch and a blank holder, the blank being clamped in by the blank holder at an edge with a specific clamping force, and the drawn part being subsequently drawn between the die and the punch.

Such a method is disclosed for example in an article by F.-J. Neff, "CNC and DNC operation in hydraulic presses" in the publication Werkstatt und Betrieb (Workshop and Plant), 119 (1986) 11, pages 947 to 949.

In hand-fed drawing presses it is customary practice in pressing plants to correct the drawing process, which occurs in a timed sequence, on the basis of a continuous visual inspection of the drawn parts by the operating personnel and of an individual manual intervention in the adjustment of the blank-holding force. This is therefore a case of an adjustment process in which the human being is included as an essential, process-determining element. Apart from the monotony associated with this and the required constant attentiveness and responsibility of the operating personnel, drawn part errors resulting from an inaccurate or incorrect adjustment of the blank-holding force are often not promptly detected so that despite a constant monitoring of the drawing processes, faulty drawn parts leave the drawing press and adversely affect the productivity of the drawing press. In automatically fed presses or in pressing trains, only random sample-like visual inspection is carried out so that, particularly in modem pressing plants, there is a greater risk of rejected parts than in plants which still have complete manual operation.

In the aforementioned article by Neff, the author reports on a system for automatic quality inspection in pressing plants with appropriately developed hardware and software for a largely optimized press operation. Displacement sensors and pressure sensors for slides and die cushions are integrated into the presses. As a result, the stroke/slide force curve for each individual workpiece can be measured and also displayed with a monitor. This actual-value curve can be compared for each individual workpiece with a workpiece-specific reference curve. At the start of production, the reference curve is produced or empirically determined for a specific workpiece to be manufactured and the data are stored; in fact, for example the stroke/slide force curve of the first fault-free drawn part can be used as a reference curve. By means of the prescribed procedure and other measures not mentioned here, rapid refitting of a press to other workpieces and a monitored, i.e. failure free press operation, or press operation in which an alarm is automatically given in the event of a failure, is ensured. It is mentioned that rejected parte during press operation as a result of tool wear can arise as a result of quality changes on the workpiece with respect to dimensions or material or as a result of quality of the lubrication. By means of a repeated comparison, in a timed sequence, of the variation of the workpiece individual stroke/slide force curve with the reference curve, rejected parts can be detected automatically and early. In the event of a tolerance range which "accompanies" the reference curve being exceeded or undershot, a fault is reported and the machine is deactivated so that, if appropriate, intervention by personnel can occur. The press itself which is monitored in such a way obviously operates, at least until the next failure, with a constant setting of all process parameters.

In another article, by D. Bauer, G. Gucker and R. Thor, "Computer-Supported Blank-Holding Pressure Optimizes Deep Drawing" in the publication Bleche-BanderRohre (Sheet Metal, Strip Metal, Pipes) 5-1990, pages 50 to 54, the authors initially point out that for the deep drawing of fault-free pans it is necessary for the blank-holding force not to be allowed to undershoot a specific minimum value which changes as a function of stroke and not to exceed a specific maximum value which also changes as a function of stroke, the curves for the minimum values and maximum values behaving in a workpiece-dependent fashion. Excessively high blank holding forces lead to fractures on the drawn part, whereas a blank holder which is pressed on too weakly allows folds to arise. The article recommends deviating from the previously widespread variation of the blank holding force which had a more or less high degree of constancy and using a variation of the blank-holding force against the press stroke which is optimized in dependence on the type of workpiece, it being possible for such a non-constant blank-holding force variation to be made up from several sections of a constant and/or a linearly rising or descending course or from a functionally stipulated course. The desired-value variation for the blank-holding force can be optimized in various aspects according to the cited publication and, depending on the optimization objective, possibly also has a different appearance. For example, the blank-holding force variation can also be optimized with respect to the maximum drawn part quality, in which case it is also possible here again for different considerations, depending on the type of workpiece, to be emphasized, for example freedom from fractures or folds or avoidance of shrink marks. Instead, when optimizing the blank-holding force variation, the design of the drawing process can also be more significant, for example the increase in the acceptable drawing depth with the objective of possibly being able to omit a drawing stage or save on sheet metal or achieve a greater strength of the drawn part. Tribological considerations can also be included in the optimization of the variation of the blank-holding force. The optimized blank-holding force variation, once it has been ascertained for a specific workpiece, is then followed up in a closed-loop controlled fashion during each pressing cycle, the ascertained desired-value curve, with the exception of occasional, subsequent manual improvements, being, however, uniformly maintained. Despite the use of a variation of the blank-holding force which is optimized to this extent and a corresponding closed-loop control in accordance with this variation, the aforesaid article does not go into detail on an automatic detection of errors on the dram part.

An object of the invention is to improve the method of the genetic type to the extent that, in the case of non-optimum setting of the process parameters or in the case of a failure which is caused for example by quality changes or lubrication changes on the part of the workpiece, the latter can be detected automatically and early, i.e. while the drawn part is still in the working space of the press, and a suitable correction of the set value of the clamping force of the blank holder can become effective immediately, i.e. for the next workpiece and can also be performed automatically.

This and other objects are achieved by the present invention which provides a method for operating a drawing press which produces a drawn part during each working cycle, one blank being inserted into the drawing tool of the drawing press, this tool including a die, a punch and a blank holder, the blank being clamped in by the blank holder at an edge with a specific clamping force and the drawn part being subsequently drawn between the die and the punch. The method comprises, before starting up production of drawn parts of a specific type, determining and storing: an optimum drawing force variation, dependent on at least one of time and pressing stroke, of a drawing punch force exerted on the drawn part during the drawing process; an upward deviation from the optimum drawing force variation which is acceptable without risking production of fractures; and a downward deviation from this optimum drawing force variation which is acceptable without risking production of folds, such that for the specific type of drawn part to be drawn, data for a desired-value drawing force range which is dependent on at least one of time and pressing stroke is stored. The drawing force must vary within the desired-value drawing force range in order to expect acceptable drawn parts that are fracture-free and fold-free. During each working cycle during production of drawn parts of the specific type, an actual-value drawing force variation is measured that is dependent on at least one of the time and the pressing stroke, of the drawing force exerted on the drawn part during the drawing process. The quality of the drawn part is automatically monitored during each working cycle with respect to the fractures and folds by comparing the data of the actual-value drawing force range, this comparing including determining whether the actual-value drawing force variation: varies within the desired-value drawing force range during the entire drawing path; exceeded the desired-value drawing force range to indicate fractures; or undershot the desired-value drawing force range to indicate folds. The clamping force which can be set at the blank holder is automatically optimized, the clamping force for the following working cycle being changed or maintained uniformly as a function of the detected drawn part quality of a drawn pan drawn in a preceding working cycle. This automatic optimizing includes: lowering the clamping force for the following working cycle with respect to the value of the clamping force set in the preceding working cycle which resulted in a fractured drawn part quality of the previously drawn part; uniformly maintaining the clamping force in the following cycle when the previously drawn part is fault-free and is of acceptable drawn part quality; and increasing the clamping force for the following working cycle with respect to the value of the clamping force set in the preceding work cycle which resulted in folded drawn part quality of the previously drawn part. At least one of the time and the degree of exceeding or undershooting within the working cycle of the desired-value drawing force range by the actual-value drawing force variation is detected, the at least one of time and the degree of exceeding and undershooting being hereinafter referred to as the damage signal. The clamping force of the blank holder is changed to a greater extent the earlier the damage signal occurs and the stronger the damage signal is, in comparison to when a damage signal occurs late or a weaker damage signal occurs.

According to the prior art, before starting up production for each type of a part to be drawn a range, dependent on time or press stroke, of the drawing punch force exerted on the part during the drawing process, the "desired drawing force range", is determined and the data are stored, within which range the drawing punch force must vary in order to be able to expect fracture-free and fold-free, that is to say "acceptable" drawn parts. Therefore, during each press stroke the actual-value drawing force variation which occurs over time can subsequently be measured and it is possible to monitor whether this variation stays within the desired-value drawing force range and whether it has exceeded (fractures) or undershot (folds) the desired-value drawing force range.

According to the invention, this possibility of an automatic fault detection on the drawn part with respect to the "fracturing" and "folding" types of fault is utilized during the drawing process itself in order to make automatic corrective interventions so that the press can continue to operate in the event of failures and, at most, one faulty part or, in the case of serious failures, possibly two faulty parts are pressed and subsequently acceptable parts are produced again. By means of the automatic fault detection, the method of process optimization which was previously operated, that is to say controlled, manually and under the inspection of humans, becomes a control process which proceeds automatically and in a closed cycle. According to the invention, during the automatic fault detection and technical control process adaptation, the time and/or the degree of the damage signal is detected within the respective working cycle, in which case the clamping force of the blank-holder is changed to a greater extent when a damage signal occurs early or when a stronger damage signal occurs than when a damage signal occurs later or a weaker damage signal occurs.

Expedient embodiments of the invention provide automatic detection of fluctuations of process parameters and/or of quality fluctuations of the semifinished product, which fluctuations require in each case a corresponding adaption of the blank-holding force in order to achieve optimum process control. Fluctuations of this kind are caused in particular by changes in

- the material strength of the sheet bars,
- the thickness of the sheet metal,
- the roughness of the surface of the sheet bars,
- the thickness of the lubrication film and
- the viscosity of the lubricant.

Other objects, advantages and novel features of the present invention will become apparent from the following detailed description of the invention when considered in conjunction with the accompanying drawings.

DETAILED DESCRIPTION OF THE DRAWINGS

Figure 1:
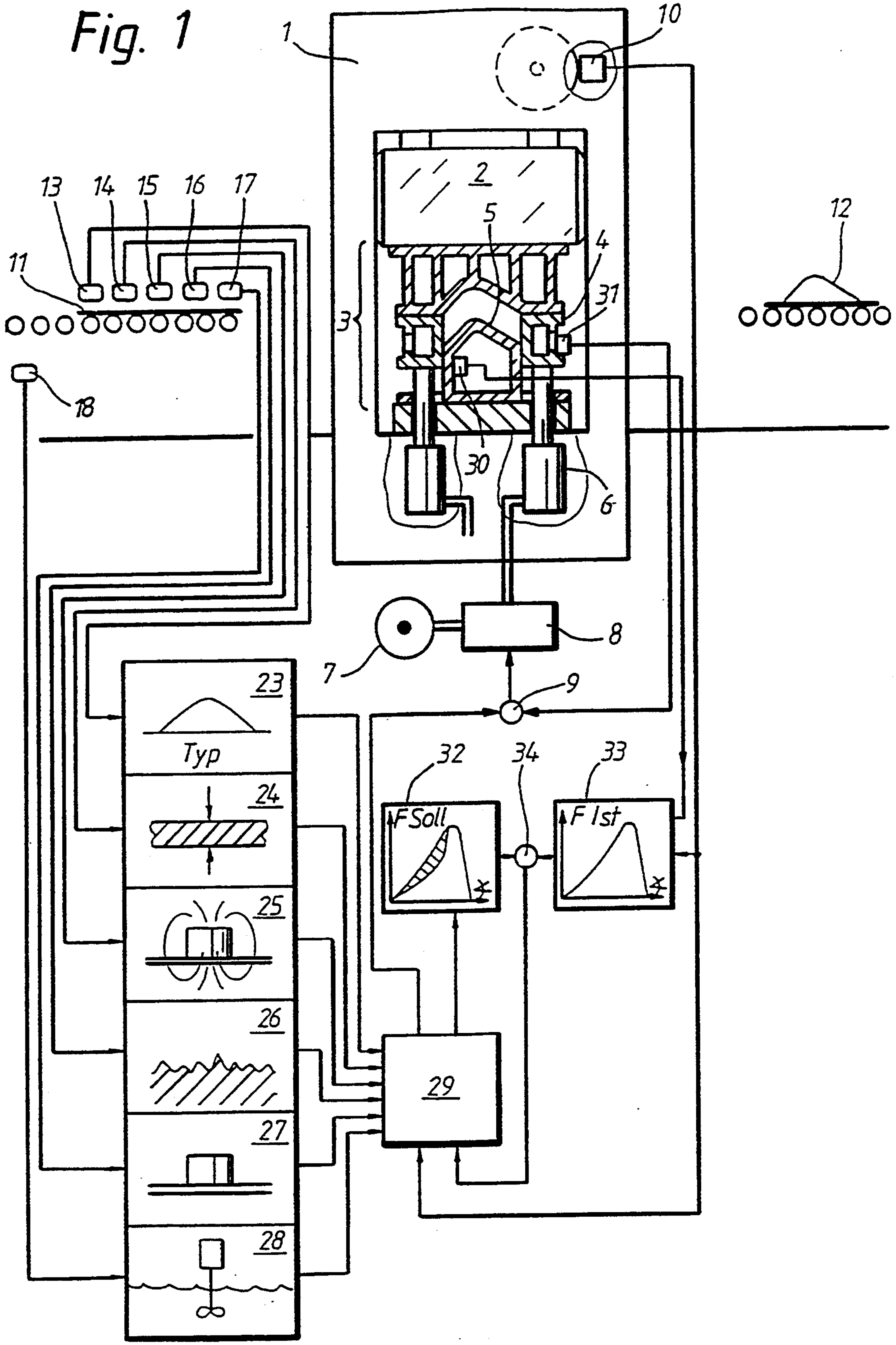
FIG. 1 shows a method diagram for an automatic, iterative process optimization of drawing processes in presses in accordance with an embodiment of the present invention.

In the exemplary embodiment of a method diagram shown in FIG. 1, the drawing press 1 is constructed as a single-acting press in which a die cushion 6 is provided in the press table or in the press bass and in which the lower part of the tool 3 is divided into a drawing punch 5 and into a blank holder 4 which is supported on the die cushion 6. The die of the drawing tool 3 is connected to the slide 2 of the press. The present invention can also be applied to double-acting presses or to presses with a hydraulic slide drive. In addition, it can be assumed from the drawing press 1 illustrated in FIG. 1 that its slide 2 is driven in a stroke fashion via a crank drive (not illustrated in detail), it being possible to determine the crank angle of the press via an angle sensor 10 and thus to provide unambiguous information relating to the position of the movable part of the tool in relation to the lower dead-center UT by technical measuring means.

A force sensor 30 for the continuous detection of the drawing force is attached to the drawing punch 5. At least one force sensor 31 for the continuous detection of the blank-holding force or clamping force is attached to the blank holder 4. Both force signals are, like the angle signal of the angle sensor 10, fed into the device (to be explained in greater detail below) for rite automatic iterative process optimization of the drawing process.

The hydraulic die cushion 6 is fed from a pressure source 7 via a proportional valve 8 which can be actuated electrically. The die cushion 6 and the associated proportional valve 8 can be provided multiply on the blank holder, for example at each comer, so that a total of four can be provided. Accordingly, the associated open-loop or closed-loop control for controlling the clamping force can also be of multi-channel design, however in the method diagram illustrated only a single channel is shown and subsequently explained.

The drawing press 1 operates in a timed sequence, in each case one blank, in the exemplary embodiment illustrated a flat sheet bar 11 of a drawable sheet metal, being inserted into the opened tool 3 during each working cycle. The sheet bar 11 is clamped in at the edge with a specific clamping force $F_n$ by the blank holder 4 and the part to be drawn is subsequently drawn between the die and the drawing punch 5. After the reopening of the tool 3, the finished drawn part 12 is removed and a new sheet bar 11 is inserted. It is important for the production of acceptable, that is to say fold-free and fracture-free, drawn parts that the blank-holding force $F_n$ lies within a specific range, which is to be explained subsequently in conjunction with the two diagrams in FIGS. 2 and 3.

Figure 2:
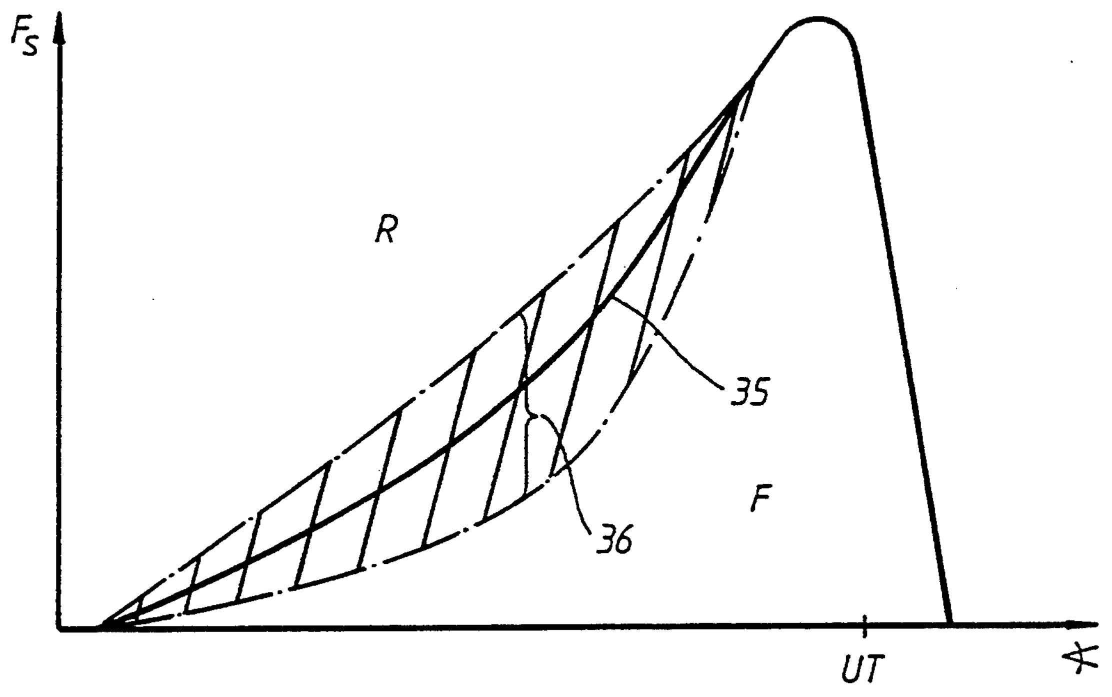
FIG. 2 shows in diagram form the ideal variation of the drawing punch force against the pressing stroke and the desired-value drawing force range above and below it.

In FIG. 2, the ideal variation of the drawing punch force F, against the pressing stroke-diagram curve 35-is illustrated for a specific type of drawn part 12. This curve has a very different shape depending on the appearance of the drawn part to be produced but it is always true that the drawing punch force rises during the pressing stroke to a maximum value, which is just before the lower dead-center is reached, and subsequently drops very steeply. Starting from the ideal shape of the rising branch of the curve, courses above and below it can be permitted. However, for a specific individual piece of a drawn part, when the course of the drawing punch force lies too far above the ideal curve 35, it must be expected that fractures will occur in the drawn part. Conversely, downward deviations, of any desired size, of the drawing punch force from the ideal curve cannot be permitted either because otherwise the probability of the formation of folds on the drawn part is too large. In the diagram according to FIG. 2, a specific hatched area 36 is indicated within which the drawing force must stay for individual concrete drawing processes of the respective type of drawn parts. This range is subsequently referred to as the desired-value drawing force range 36. Above it there is the area R in which fractures are to be expected with a very high probability; it can be presumed that folds will arise in the area F lying below the desired value drawing force range 36.

Figure 3:
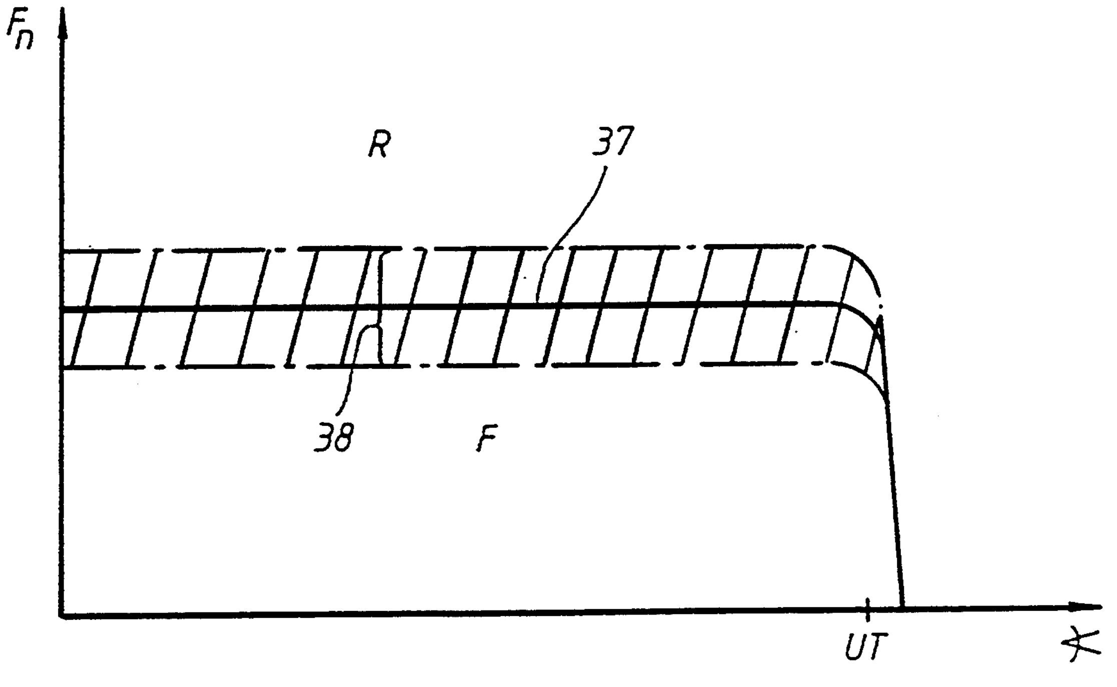
FIG. 3 shows, also in diagram form, the ideal variation of the blank-holding force with reference to the example of a blank-holding force which is kept constant with respect to the pressing stroke and also shows here the desired-value range of the blank-holding force lying above and below it.

Thus the cause of necking or incipient fracturing of the sheet metal with an excessively high drawing force and a formation of folds with an excessively low drawing force depends on the degree of clamping force with which the sheet bar is clamped in at the edge by the blank holder 4. If the blank-holding force $F_n$ is at the ideal value for the respective drawn part during the entire pressing stroke, the course of the drawing punch force will also usually lie very close to the detected ideal course 35 of the drawing force. When the blank-holding force rises with respect to the ideal course 37 of the clamping force, the drawing punch force will also be displaced upwards with respect to the corresponding ideal course 35. If the pressing-on force of the blank holder were too high, the corresponding drawing force curve would slip into the area R in which fractures arise. The converse is true when the pressing-on force of the blank holder is too low; in this case, the drawing force curve would approach the area F of fold formation and, in the case of excessive reduction of the blank-holding force would even run into this area. Therefore, in the diagram according to FIG. 3, a tolerable range, which will be subsequently referred to as the desired-value clamping force range 38, for the blank-holding force $F_n$ can be stipulated. This range lies on both sides of the ideal course 37 of the clamping force and can be defined with respect to the fracture area R and the fold area F. The diagram according to FIG. 3 shows an ideal course 37 of the clamping force which remains constant and thus also shows a desired-value clamping force range 38 which extends at a uniform level. However, this depends on this particular type of workpiece for which it happens to be optimum that the clamping force is constant over the entire pressing stroke. If, in the case of a different drawn part type, it should be optimum for the clamping force to have a different course, the observation also applies correspondingly for such a part.

Therefore, after it can be determined, with reference to the actual respective variation of the drawing punch force against the pressing stroke by comparing with the corresponding desired-value drawing force range detected for the respective drawn part, whether the manufactured drawn part is acceptable or has fractures or folds, it can be decided whether the clamping force is to be maintained at the same level for the next pressing cycle, to be decreased or increased. The present invention exploits this consideration.

For this purpose, a function memory 32 is provided for the desired-value drawing force range 36 (see FIG. 1). In addition, a function memory 33 is installed for the respective actual-value drawing force course into which both the signal of the angle sensor 10 for the crank shaft angle and the signal of the force generator 30 for the drawing force is fed. In a comparator 34, a comparison can be carried out between the desired-value drawing force range on the one hand and the actual-value drawing force course on the other. If this comparison gives positive results, i.e. if the actual-value drawing force course lies within the desired-value drawing force range, the next pressing stroke is carried out with the same clamping force or with the clamping force course with which the last drawn pan is also drawn. If, on the other hand, the result of the desired-value/actual-value comparison of the drawing force is that the actual-value drawing force course has upwardly exceeded the desired value drawing force range at some point of the pressing stroke, not only is the respective part ejected from the further production process, but the blank-holding force is also automatically reduced for the next pressing stroke. In the event that the desired-value drawing force range has been undershot at some point of the pressing stroke during the desired-value/actual-value comparison, during the next pressing stroke a higher blank-holding force is automatically set.

A computer 29 which transmits appropriate data into the function memory for the desired-value drawing force range is provided as an essential component of such a control device. As long as the quality of the sheet bars 11 and the quality of the sheet bar lubrication remains unchanged, the data for the desired-value drawing force range set in the function memory 32 are also unchanged. The computer 29 also supplies to the point 9 of the desired-value/actual-value comparison the respective desired value for the blank-holding force which is constant against the pressing stroke in the example shown in FIG. 3. In other types of drawn parts having a course of the blank-holding force which is optimally not constant, a correspondingly variable desired-value would be fed into the comparison point 9 as a function of the pressing stroke. Depending on the result of the desired-value/actual-value comparison between the desired and actual clamping force, the clamping force is increased or reduced via the proportional valve 8 so that the desired course of the clamping force can be followed in a controlled fashion.

The computer 29 is also provided with the result of the desired-value/actual-value comparison between the actual-value drawing force course on the one hand and the desired-value drawing force range on the other. Depending on the result of this comparison, as stated, the same value as previously is fed from the computer 29 into the comparison point 9 as a new set-value for the blank holding force or, if appropriate, even a changed set value for the subsequent pressing stroke. This computer therefore stipulates for each individual pressing stroke in each case the desired-value or the desired-value course for the blank-holding force according to which the said force is to be adjusted. In addition, the computer 29 supplies the data for the desired-value drawing force range, which it feeds into the function memory 32 and, if required, also changes from one pressing stroke to the next.

In the comparison between the desired-value drawing force range and the actual-value drawing force course, not only is the fact of a deviation and the direction of the deviation detected but also the time of the deviation within the pressing stroke and the size of the deviation, if appropriate. In the case of a negative desired-value/actual-value comparison, this information permits the computer 29 to react selectively as a function of the difference between the two values. When a deviation from the tolerance range of the desired-value drawing force occurs early, the blank-holding force for the next pressing stroke changes to a greater extent than when the tolerance range is left later. In the same way, a very large degree of deviation of the drawing punch force from the acceptable tolerance range also leads to a higher degree of change of the blank-holding force, and vice versa. As a result, in the case of a setting of the blank-holding force which is highly errored, optimum setting can be achieved in few iteration steps, ideally with only one step.

Previously, it was assumed that the sheet bar quality and the quality of the lubrication remain unchanged. Given this assumption, corresponding failures could still at most originate from the press itself. It would be possible to intercept or compensate failures of this kind from out of the previously described system. Workpiece-side failures which are due to quality changes in the sheet bar or its lubrication would, however, be detected promptly at the sheet bar and fed into the open loop or closed-loop control system. For this reason, a plurality of sensors with which the properties of the sheet bar or its lubrication which are relevant for a uniform drawing result can be detected using measuring technology are provided in the area of the sheet bar 11. Firstly, an input point 13 for the respective type of workpiece is provided. This input point 13 is coupled to a corresponding data processing device 23 which provides a base function for the optimum drawing force course and the desired value drawing force range as well as a base function for the ideal course of the clamping force and the desired value clamping force range to the computer 29. This data is stored in the function part 23 of the data processing device for the particular type of workpiece and is called up appropriately.

A sensor 14 for the detection of the thickness of the sheet metal of the sheet bar 11 is provided, with which sensor 14 fluctuations in the thickness of the sheet bar can be detected. The corresponding signals are fed to a further function part 24 for the data processing in relation to the thickness of the sheet metal. This function part 24 contains correction factors or correction algorithms which are to be taken into account in the case of dimensional deviations with respect to a nominal value of the thickness of the sheet bar. The correction factors or algorithms are also passed on to the computer 29.

By means of a further sensor 15, the quality of the material of the sheet bar can be detected. This can be, for example, an inductively operating sensor which measures the magnetic permeability of the sheet metal and makes conclusions regarding different degrees of material strength from changes in this value. The corresponding signals are also passed on to a function block 25 for the data processing in relation to the material quality which also feeds the computer 29 with appropriate correction values or correction algorithms in accordance with the deviation with respect to a standard value.

The surface quality, in particular the roughness of the sheet bar, is significant and can be detected by a sensor 16 which operates, for example, in a contactless, optical fashion. Corresponding measurement values are passed on to the associated function block 6 for the data processing for roughness, which function block 26 itself passes on correction values or algorithms to the computer 29 if the measured roughness deviates in one direction or another with respect to a standard value.

The type of lubrication of the sheet bar is also important for a uniform drawing result. In this context, the thickness of the lubrication film can be measured by a sensor 17 which operates, for example, capacitively. The connected function block 27 for the data processing of the thickness of the lubrication film also feeds the computer 29 with corresponding correction values or algorithms in the event of a deviation of the thickness of the lubrication film with respect to a standard value. The viscosity of the lubricant used is continuously detected with the sensor 18; the correspondingly connected function block 28 for the data processing with respect to the viscosity of the lubricant is also connected to the computer 29.

By virtue of the continuous quality monitoring of the sheet bar 11 and of the lubrication with respect to the mentioned properties and the corresponding data processing, the computer 29 is able to calculate in advance a respective data set, adapted to the changed sheet bar side conditions, for the desired-value drawing force range and the desired-value course of the blank-holding force for the next pressing cycle. In the event that the material strength is increased with respect to a standard value, the blank-holding force will be greater than normal. It is similar with the thickness of the sheet metal; in the case of a thicker sheet metal, the blank holder must also be pressed on more strongly than in the case of a less thick metal sheet. For the roughness of the surface of the sheet bar 11 the opposite is true; the rougher the surface, the smaller the blank-holding force must be in order to obtain the trend of identical drawing qualities. The trend for the thickness of the lubrication film behaves with an opposite effect; the thicker the lubrication film, the greater the blank-holding force which is required in order to obtain drawing results of the same kind. It is also similar with the viscosity of the lubricant; with a viscous lubricant, the trend must be for the edge of the sheet bar to be clamped more strongly than in the case of a low-viscosity lubricant.

When using an adaptive computer, the extremely different influences and the degree to which they are to be taken into account in practice can be optimized automatically.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Method for operating a drawing press which produces a drawn part during each working cycle, one blank being inserted into the drawing tool of the drawing press, said tool including a die, a punch and a blank holder, the blank being clamped in by the blank holder at an edge with a specific clamping force and the drawn part being subsequently drawn between the die and the punch, the method comprising:

before starting up production of drawn parts of a specific type, determining and storing: an optimum drawing force variation, dependent on at least one of time and pressing stroke, of a drawing punch force exerted on the drawn part during the drawing process; an upward deviation from the optimum drawing force variation which is acceptable without risking production of fractures; and a downward deviation from this optimum drawing force variation which is acceptable without risking production of folds, such that for the specific type of drawn part to be drawn, data for a desired-value drawing force range which is dependent on at least one of time and pressing stroke is stored, wherein the drawing force must vary within the desired-value drawing force range in order to expect acceptable drawn parts that are fracture-free and fold-free;

measuring during each working cycle during production of drawn parts of the specific type, an actual-value drawing force variation, dependent on at least one of the time and the pressing stroke, of the drawing force exerted on the drawn part during the drawing process;

automatically monitoring the quality of the drawn part during each working cycle with respect to the fractures and folds by comparing the data of the actual-value drawing force range, said comparing including determining whether the actual-value drawing force variation: varies within the desired-value drawing force range during the entire drawing path; exceeded the desired-value drawing force range to indicate fractures; or undershot the desired-value drawing force range to indicate folds;

automatically optimizing the clamping force which can be set at the blank holder, the clamping force for the following working cycle being changed or maintained uniformly as a function of the detected drawn part quality of a drawn part drawn in a preceding working cycle, the automatic optimizing including:

lowering the clamping force for the following working cycle with respect to the value of the clamping force set in the preceding working cycle which resulted in a fractured drawn part quality of the previously drawn part;

uniformly maintaining the clamping force in the following cycle when the previously drawn part is fault-free and is of acceptable drawn part quality; and increasing the clamping force for the following working cycle with respect to the value of the clamping force set in the preceding work cycle which resulted in folded drawn part quality of the previously drawn part;

detecting at least one of the time and the degree of exceeding or undershooting within the working cycle of the desired-value drawing force range by the actual-value drawing force variation, the at least one of time and the degree of exceeding and undershooting being hereinafter referred to as the damage signal;

changing the clamping force of the blank holder to a greater extent the earlier the damage signal occurs and the stronger the damage signal is, in comparison to when a damage signal occurs late or a weaker damage signal occurs.

2. Method according to claim 1, further comprising detecting the material strength of each sheet bar, the clamping force of the blank holder being set higher when the material strength is higher than when the material strength is lower.

3. Method according to claim 1, further comprising detecting the sheet metal thickness of the sheet bar, the clamping force of the blank holder being set higher when the sheet metal thickness is greater than when the metal thickness is lesser.

4. Method according to claim 1, further comprising detecting the roughness of the surface of the sheet bar, the clamping force of the blank holder being set lower when the roughness is greater than when the roughness is lesser.

5. Method according to claim 1, further comprising lubricating each sheet bar before insertion into the drawing tool with a lubricating film, and subsequently detecting the thickness of the lubricating film, the clamping force of the blank holder being set higher when the lubricating film thickness is greater than when the lubricating film thickness is lesser.

6. Method according to claim 1, further comprising lubricating each sheet bar before insertion into the drawing tool with a film of lubricant, and continuously detecting the viscosity of the lubricant, the clamping force of the blank holder being set higher when the viscosity of lubricant is greater than when the viscosity of the lubricant is lesser.

7. Method according to claim 2, further comprising calculating an optimum blank-holding force for the sheet bar which is to be newly inserted into the drawing press in advance from the measurement parameters detected on the sheet bar which is to be newly inserted into the drawing press, said measuring parameters relating to at least one of material strength, sheet metal thickness, roughness, thickness of lubricating film and viscosity of the lubricating film.

8. Method according to claim 3, further comprising calculating an optimum blank-holding force for the sheet bar which is to be newly inserted into the drawing press in advance from the measurement parameters detected on the sheet bar which is to be newly inserted into the drawing press, said measuring parameters relating to at least one of material strength, sheet metal thickness, roughness, thickness of lubricating film and viscosity of the lubricating film.

9. Method according to claim 4, further comprising calculating an optimum blank-holding force for the sheet bar which is to be newly inserted into the drawing press in advance from the measurement parameters detected on the sheet bar which is to be newly inserted into the drawing press, said measuring parameters relating to at least one of material strength, sheet metal thickness, roughness, thickness of lubricating film and viscosity of the lubricating film.

10. Method according to claim 5, further comprising calculating an optimum blank-holding force for the sheet bar which is to be newly inserted into the drawing press in advance from the measurement parameters detected on the sheet bar which is to be newly inserted into the drawing press, said measuring parameters relating to at least one of material strength, sheet metal thickness, roughness, thickness of lubricating film and viscosity of the lubricating film.

11. Method according to claim 6, further comprising calculating an optimum blank-holding force for the sheet bar which is to be newly inserted into the drawing press in advance from the measurement parameters detected on the sheet bar which is to be newly inserted into the drawing press, said measuring parameters relating to at least one of material strength, sheet metal thickness, roughness, thickness of lubricating film and viscosity of the lubricating film.

* * * * *